(12) United States Patent
Wang et al.

(10) Patent No.: US 10,401,686 B2
(45) Date of Patent: Sep. 3, 2019

(54) DISPLAY SUBSTRATE AND METHOD FOR FABRICATING THE SAME, DISPLAY PANEL, DISPLAY DEVICE

(71) Applicant: BOE TECHNOLOGY GROUP CO., LTD., Beijing (CN)

(72) Inventors: Qian Wang, Beijing (CN); Xiaochuan Chen, Beijing (CN); Wenqing Zhao, Beijing (CN); Jian Gao, Beijing (CN); Xiaochen Niu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/766,098

(22) PCT Filed: May 18, 2017

(86) PCT No.: PCT/CN2017/084945
§ 371 (c)(1),
(2) Date: Apr. 5, 2018

(87) PCT Pub. No.: WO2017/198200
PCT Pub. Date: Nov. 23, 2017

(65) Prior Publication Data
US 2018/0299733 A1    Oct. 18, 2018

(30) Foreign Application Priority Data
May 18, 2016    (CN) .......................... 2016 1 0332730

(51) Int. Cl.
G02F 1/1337    (2006.01)
G02F 1/1343    (2006.01)
G02F 1/1362    (2006.01)

(52) U.S. Cl.
CPC .. G02F 1/133707 (2013.01); G02F 1/134309 (2013.01); G02F 1/136286 (2013.01);
(Continued)

(58) Field of Classification Search
CPC ................................................. G02F 1/133707
See application file for complete search history.

(56) References Cited

U.S. PATENT DOCUMENTS

2005/0248704 A1    11/2005  Ohmuro et al.
2007/0030428 A1    2/2007   Lu et al.
(Continued)

FOREIGN PATENT DOCUMENTS

CN    1924674 A    3/2007
CN    101726925 A  6/2010
(Continued)

OTHER PUBLICATIONS

Search Report from International Application No. PCT/CN2017/084945 dated Aug. 17, 2017.

*Primary Examiner* — Edmond C Lau
(74) *Attorney, Agent, or Firm* — Clafee, Halter & Griswold LLP

(57) ABSTRACT

A display substrate is disclosed, including pixel units defined by gate lines and data lines, and a first alignment layer. The first alignment layer includes first alignment grooves arranged in a first direction, the first direction forms a first intersection angle with a positive direction of a first side of each pixel unit, the first intersection angle is an obtuse angle, and the first intersection angle is smaller than an intersection angle between an orientation of liquid crystal molecule in a working state and the positive direction of the first side of each pixel unit. The direction of alignment grooves is decreased, so that the rotation angle of liquid crystal molecule is decreased, which reduces the responsive time of liquid crystal. A method for fabricating a display substrate, a display panel, and a display device are also disclosed.

20 Claims, 2 Drawing Sheets

(52) U.S. Cl.
CPC .......... *G02F 2001/133738* (2013.01); *G02F 2001/134372* (2013.01); *G02F 2201/121* (2013.01); *G02F 2201/123* (2013.01)

(56) References Cited

U.S. PATENT DOCUMENTS

| | | | |
|---|---|---|---|
| 2014/0098335 A1* | 4/2014 | Kamada | ............ G02F 1/134309 349/142 |
| 2015/0049269 A1 | 2/2015 | Okazaki | |
| 2015/0205148 A1* | 7/2015 | Asakwa | ............ G02F 1/133707 349/43 |

FOREIGN PATENT DOCUMENTS

| | | |
|---|---|---|
| CN | 104160326 A | 11/2014 |
| CN | 105807498 A | 7/2016 |
| CN | 205750217 U | 11/2016 |

* cited by examiner

|  | 0 | 32 | 64 | 96 | 128 | 160 | 192 | 224 | 255 |
|---|---|---|---|---|---|---|---|---|---|
| 0 |  | 31.35 | 37.8 | 43.06 | 41.41 | 35.96 | 31.24 | 23.78 | 14.56 |
| 32 | 9.91 |  | 34.05 | 38.31 | 38.45 | 37.69 | 30.85 | 23.21 | 13.66 |
| 64 | 10.34 | 20.11 |  | 35.46 | 35.57 | 33.3 | 28.65 | 22.13 | 12.83 |
| 96 | 10.45 | 19.32 | 27.24 |  | 33.3 | 30.7 | 26.2 | 20.83 | 12.11 |
| 128 | 10.59 | 18.05 | 26.31 | 28.14 |  | 27.6 | 23.42 | 19.57 | 11.17 |
| 160 | 10.88 | 18.49 | 25.19 | 28.4 | 28.4 |  | 21.84 | 19.42 | 11.71 |
| 192 | 11.35 | 17.41 | 24 | 27.36 | 27.5 | 25.48 |  | 17.41 | 11.57 |
| 224 | 12 | 17.73 | 23.32 | 26.63 | 26.81 | 25.66 | 23.53 |  | 12.61 |
| 255 | 13.55 | 18.63 | 23.71 | 27.21 | 27.53 | 26.13 | 24.58 | 20.5 |  |

|  | 0 | 32 | 64 | 96 | 128 | 160 | 192 | 224 | 255 |
|---|---|---|---|---|---|---|---|---|---|
| 0 |  | 32.83 | 32.07 | 27.39 | 28.54 | 26.81 | 22.67 | 23.57 | 13.69 |
| 32 | 9.8 |  | 30.52 | 29.55 | 28.79 | 27.57 | 24.25 | 20 | 13.51 |
| 64 | 9.98 | 16.72 |  | 31.21 | 25.08 | 23.06 | 21.55 | 17.8 | 12.72 |
| 96 | 9.98 | 17.41 | 21.01 |  | 24.61 | 22.67 | 19.75 | 17.37 | 12.11 |
| 128 | 10.49 | 15.89 | 20.83 | 25.08 |  | 20.36 | 19.82 | 17.51 | 11.86 |
| 160 | 10.63 | 15.39 | 18.59 | 20.05 | 20.97 |  | 18.16 | 16.5 | 11.75 |
| 192 | 10.92 | 15.24 | 18.91 | 20.22 | 20.9 | 19.21 |  | 18.41 | 12 |
| 224 | 10.95 | 15.39 | 17.8 | 19.6 | 20.72 | 19.6 | 17.15 |  | 15.5 |
| 255 | 12.54 | 15.93 | 18.05 | 20.36 | 20.76 | 20.29 | 22.22 | 18.16 |  |

DISPLAY SUBSTRATE AND METHOD FOR FABRICATING THE SAME, DISPLAY PANEL, DISPLAY DEVICE

RELATED APPLICATIONS

The present application is the U.S. national phase entry of PCT/CN2017/084945, with an international filing date of May 18, 2017, which claims the benefit of Chinese Patent Application No. 201610332730.0, filed on May 18, 2016, the entire disclosures of which are incorporated herein by reference.

TECHNICAL FIELD

The present disclosure relates to the field of display technology, and particularly to a display substrate, a method for fabricating the same, a display panel, and a display device.

BACKGROUND

A thin film transistor liquid crystal display device (TFT-LCD) has become popular in the current market of a flat display device, due to its advantages of small volume, low power consumption, radiation free, low production cost. For example, the TFT-LCD has been widely applied to a liquid crystal TV, a mobile phone, a personal digital assistant (PDA), a digital camera, a computer screen, or a notebook screen.

Generally, the TFT-LCD comprises a shell, and a liquid crystal display panel and a backlight module in the shell. The liquid crystal display panel comprises an array substrate, a color film substrate, and liquid crystal sandwiched therebetween. The array substrate and the color film substrate are assembled to prevent liquid crystal therebetween from outflowing. During assembling, a frame sealant is applied at the periphery of the array substrate and the color film substrate to form a liquid crystal cell. An electric field is applied to control deflection of liquid crystal so as to control the intensity of light, and the color film substrate cooperates so that the desired image is presented.

Currently, there are strict requirements for the responsive time of the liquid crystal display device in the field of AR (Augmented Reality) and VR (Virtual Reality). For example, it is required that the gray-to-gray responsive time (GTG RT) be smaller than 3 ms. Thus, it is desired to reduce the responsive time of liquid crystal in the art.

SUMMARY

Embodiments of the present disclosure provide a display substrate, a method for fabricating the same, a display panel, and a display device, to reduce the responsive time of liquid crystal.

In a first aspect, an embodiment of the present disclosure provides a display substrate, comprising pixel units which are defined by gate lines and data lines, and a first alignment layer, wherein the first alignment layer comprises a plurality of first alignment grooves which are arranged in a first direction, the first direction and a positive direction of a first side of each of the pixel units form a first intersection angle, the first intersection angle is an obtuse angle, the first intersection angle is smaller than an intersection angle between an orientation of liquid crystal molecule in a working state and the positive direction of the first side of each of the pixel units, and the first side of each of the pixel units is substantially parallel with an extending direction of the gate lines or the data lines.

For example, each of the pixel units comprises a pixel electrode and a common electrode, and at least one of the pixel electrode and the common electrode comprises a plurality of strip shaped electrodes for generating a horizontal driving electric field, an arranging direction of the strip shaped electrodes and a positive direction of a first side of each of the pixel units forms a second intersection angle, and the second intersection angle is an acute angle.

For example, the common electrode is a plate shaped electrode, and the pixel electrode comprises the plurality of strip shaped electrodes.

For example, the first intersection angle and the second intersection angle satisfy the relation of: the first intersection angle<the second intersection angle+90°.

For example, the first intersection angle satisfies the relation of: 90°<the first intersection angle≤120°.

For example, the first intersection angle is 100°.

For example, the second intersection angle satisfies the relation of: 80°≤the second intersection angle<90°.

For example, the second intersection angle is 85°.

For example, the first side is a short side of the pixel unit.

In a second aspect, an embodiment of the present disclosure provides a display panel, comprising: the display substrate as described above; a counter substrate, which is arranged oppositely to the display substrate; and a liquid crystal layer, which is arranged between the display substrate and the counter substrate.

For example, the counter substrate comprises a second alignment layer, the second alignment layer comprises a plurality of second alignment grooves which are arranged in a second direction, and the second direction is parallel with the first direction.

For example, the liquid crystal layer comprises a positive liquid crystal.

In a third aspect, an embodiment of the present disclosure provides a display device, comprising the display panel as described above.

In a fourth aspect, an embodiment of the present disclosure provides a method for fabricating a display substrate, comprising: forming a pixel units on a first substrate which are defined by gate lines and data lines; forming a first alignment layer on the first substrate on which the pixel units have been formed; and forming a plurality of first alignment grooves which are arranged in a first direction on the first alignment layer, wherein the first direction and a positive direction of a first side of each of the pixel units form a first intersection angle, the first intersection angle is an obtuse angle, the first intersection angle is smaller than an intersection angle between an orientation of liquid crystal molecule in a working state and the positive direction of the first side of each of the pixel units, and the first side of each of the pixel units is substantially parallel with an extending direction of the gate lines or the data lines.

For example, forming the pixel units comprises: forming a plate shaped common electrode on the first substrate, and forming on the common electrode a pixel electrode which comprises a plurality of strip shaped electrodes for generating a horizontal driving electric field, wherein an arranging direction of the strip shaped electrodes and a positive direction of a first side of each of the pixel units forms a second intersection angle, and the second intersection angle is an acute angle.

For example, the first intersection angle and the second intersection angle satisfy the relation of: the first intersection angle<the second intersection angle+90°.

For example, the first intersection angle satisfies the relation of: 90°<the first intersection angle≤120°.

For example, the first intersection angle is 100°.

For example, the second intersection angle satisfies the relation of: 80°≤the second intersection angle<90°.

For example, the second intersection angle is 85°

It is noted that, the method for fabricating a display substrate, the display panel, and the display device in embodiments of the present disclosure have same or similar embodiments the display substrate as described above, and accordingly has same or similar advantages and beneficial effects.

BRIEF DESCRIPTION OF THE DRAWINGS

In order to explain the technical solutions in the embodiments of the present disclosure more clearly, the drawings to be used in the description of the embodiments will be introduced briefly in the following. Apparently, the drawings described below are only some embodiments of the present disclosure, a person with ordinary skill in the art, on the premise of not paying any creative work, can also obtain other drawings from these drawings.

DETAILED DESCRIPTION OF EMBODIMENTS

Figure 1:
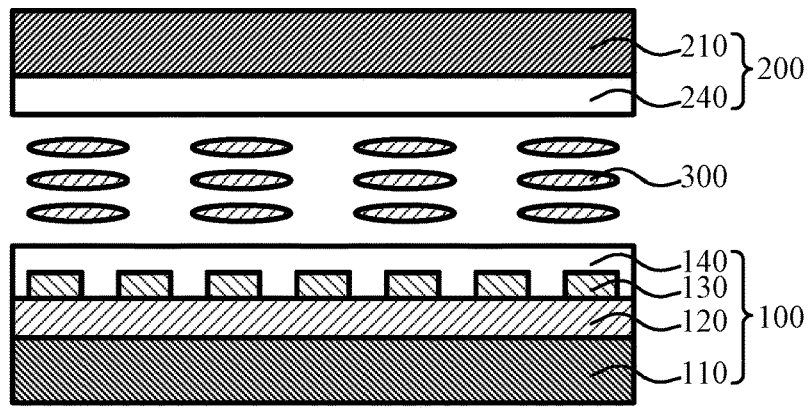
FIG. 1 is a schematic view for illustrating a display substrate and a counter substrate in an assembled state in an embodiment of the present disclosure.

The display substrate, the method for fabricating the same, the display panel, and the display device in embodiments of the present disclosure will be described in detail hereinafter with reference to the accompanying drawing.

Reference numeral: 100 display substrate; 110 first substrate; 120 common electrode; 130 pixel electrode; 135 slit; 140 first alignment layer; 140A orientation of first alignment grooves; 200 counter substrate; 210 second substrate; 240 second alignment layer; 300 liquid crystal molecule; 300I orientation of liquid crystal molecule in initial state; 300W orientation of liquid crystal molecule in the working state; 400 gate line; 500 data line; 600 pixel unit; 600A positive direction of first side of each pixel unit; 600B positive direction of second side of each pixel unit; a first intersection angle (intersection angle between orientation of first alignment grooves and positive direction of first side of each pixel unit); β second intersection angle (intersection angle between direction of pixel electrode and positive direction of first side of each pixel unit); Δθ rotation angle of liquid crystal molecule.

On the basis of improvement in the material for liquid crystal, the process is optimized to reduce responsive time of liquid crystal. The responsive time of liquid crystal consists of a rising responsive time Ton and a falling responsive time Toff. The rising responsive time Ton is also referred to as an on-state responsive time, and indicates the duration for rising from 10% to 90% of the maximum brightness. The falling responsive time Toff is also referred to as an off-state responsive time, and indicates the duration for falling from 90% to 10% of the maximum brightness. Ton and Toff are generally determined according to the following equations (1) and (2), respectively.

$$Ton = \frac{\gamma * d^2}{\varepsilon_0 * \varepsilon (Vop^2 - Vth^2)} \quad (1)$$

$$Toff = \frac{\gamma * d^2}{\pi^2 * K} \quad (2)$$

In equations (1)-(2), γ is a viscosity coefficient of liquid crystal, d is a thickness of a liquid crystal cell, $\varepsilon_0$ is a dielectric constant in vacuum, ε is a dielectric constant of liquid crystal, Vop is a driving voltage of a TFT-LCD, Vth is a threshold voltage for switching on the TFT-LCD, and K is a coefficient of elasticity of liquid crystal.

According to the above equations, Ton is mainly determined by the driving voltage Vop, and Toff is mainly determined by the viscosity property of liquid crystal. Thus, apart from improving the material of liquid crystal, responsive time is generally reduced by improving Toff.

Figure 2:
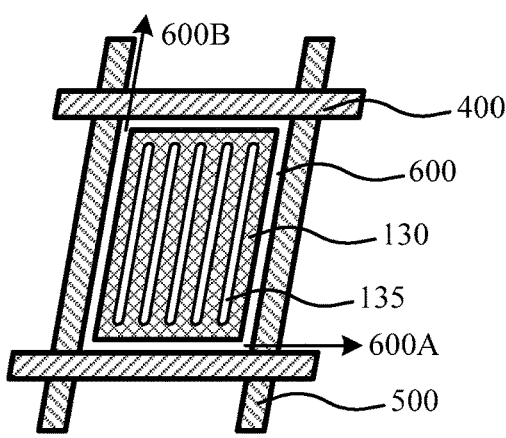
FIG. 2 is a schematic view for illustrating pixel units in a display panel in an embodiment of the present disclosure.
Figure 3:
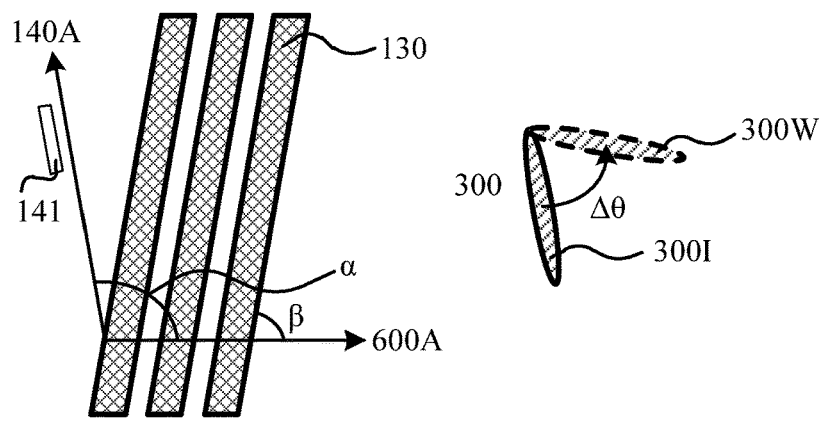
FIG. 3 is a schematic view for illustrating strip shaped electrodes and alignment grooves in a display panel in an embodiment of the present disclosure.

Reference is made to FIGS. 1-3. As shown, in an embodiment, the display panel comprises a display substrate 100 and a counter substrate 200 which are arranged oppositely. A liquid crystal molecule 300 is sandwiched between the display substrate 100 and the counter substrate 200.

In an embodiment, the display substrate 100 comprises a first substrate 110, and gate lines 400 and data lines 500 which are formed on the first substrate 110. The display substrate 100 further comprises pixel units 600 which are defined by the gate lines 400 and the data lines 500. Each of the pixel units 600 comprises a thin film transistor (not shown), a common electrode 120, and a pixel electrode 130. The thin film transistor comprises a gate electrode which is electrically connected with the gate lines 400, a source electrode which is electrically connected with the data lines 500, and a drain electrode which is electrically connected with the pixel electrode 130. The thin film transistor acts as a switching device, and is configured to control the generation of electric field for driving the liquid crystal molecule 300 to deflect.

The common electrode 120 is a plate shaped electrode, and the pixel electrode 130 is provided with a plurality of slits 135. Due to the presence of slits 135, the pixel electrode 130 is equivalent to a plurality of strip shaped electrodes in which both ends of the electrodes are connected. For example, the pixel electrode 130 is arranged over the common electrode 120. In the working state, a driving electric field is formed between the common electrode 120 and the plurality of strip shaped electrodes of the pixel electrode 130 in a horizontal direction (in a direction parallel with a surface of the first substrate 110). The direction of the driving electric field determines an orientation 300W of the liquid crystal molecule 300 in the working state.

In the case shown in FIG. 1, the pixel electrode 130 is shown as being arranged on the common electrode 120. However, this is merely schematic. In implementations, there are other layers or components, such as a dielectric layer, between the common electrode 120 and the pixel electrode 130.

In the case shown in FIGS. 1-2, the common electrode 120 is a plate shaped electrode, and the pixel electrode 130 is strip shaped electrodes which are provided with slits. In an embodiment, the strip shaped pixel electrode 130 is arranged in a single direction, which corresponds to a single domain working mode of the liquid crystal display.

In an embodiment, the display substrate 100 further comprises a first alignment layer 140 which is formed over the pixel units 600. The first alignment layer 140 comprises a plurality of first alignment grooves 141 (as schematically shown) which are arranged in an orientation 140A. The orientation 140A of the first alignment grooves determines an orientation 300I of the liquid crystal molecule 300 in the initial state (i.e., in an unenergized state).

The pixel units 600 have for example a shape of parallelogram, rectangle, or square. In other embodiments, the pixel units 600 have an irregular shape according to design requirement. In an embodiment, as shown in FIG. 2, the pixel units 600 have a shape of parallelogram, and positive directions of two neighboring sides are labeled as 600A and 600B, respectively. In this embodiment, a positive direction 600A of a first side indicates a positive direction of the short side of each of the pixel units, and a positive direction 600B of a second side indicates a positive direction of the long side of each of the pixel units.

The first side of each of the pixel units is substantially parallel with an extending direction of the gate lines or the data lines. The gate lines or data lines are only shown schematically in the drawings, but are not limited to these drawings. In some embodiments, the gate lines may comprise a locally bent line and the data lines may comprise a locally bent line, but the gate lines and data lines still extend generally in a single direction. In some embodiments, if the pixel units have a regular shape, like a parallelogram, rectangle, or square, the first side of each of the pixel units can be any side substantially parallel with an extending direction of the gate lines or the data lines. If the pixel units have a regular shape, like a circle or ellipse, the first side of each of the pixel units is a straight line between any two points on the circle. In some embodiments, the pixel units have an irregular shape, and the first side of each of the pixel units can be a straight line between any two points of the irregular shape.

When the display panel is working, a horizontal driving electric field in a transverse direction is formed between the pixel electrode and the common electrode, so that the liquid crystal 2 is arranged along the direction of the horizontal driving electric field. In the embodiment shown in FIG. 2, in each of the pixel units 600, the pixel electrode 130 comprises strip shaped slits 135. Accordingly, the direction of the horizontal driving electric field is a direction which lies in a plane parallel with the first substrate 110, and which is perpendicular with the extending direction of slits 135. In an embodiment, the liquid crystal molecule 300 comprises positive liquid crystal. During working, a long axis of this kind of liquid crystal lies in the direction of electric field lines of the horizontal driving electric field.

Generally, a first intersection angle $\alpha$ between the orientation 140A of the first alignment grooves and the pixel units 600 is 90°, and the pixel electrode 130 is inclined by 85° with respect to the positive direction 600A of the first side of each of the pixel units 600. In this case, an intersection angle between the orientation 300I of the liquid crystal molecule 300 in the initial state and the positive direction 600A of the first side is 90°. In the working state, under the influence of electric field, the liquid crystal molecule 300 deflects to a direction which is parallel with the electric field direction, i.e., the orientation 300W of the liquid crystal molecule 300 in the working state. An intersection angle between the orientation 300W and the positive direction 600A of the first side is 175°. In this case, a rotation angle $\Delta\theta$ of the liquid crystal molecule 300 is $\Delta\theta=175°-90°=85°$. This results in a long responsive time. In case this display panel with a long responsive time is applied to AR and VR, the user has a poor experience.

As shown in FIG. 1, an embodiment of the present disclosure provides a display panel. The display panel comprises the display substrate 100, the counter substrate 200 which is arranged opposite to the display substrate 100; and a liquid crystal layer which comprises the liquid crystal molecule 300 and is arranged between the display substrate 100 and the counter substrate 200.

As shown in FIGS. 1-3, the display substrate 100 comprises the first alignment layer 140 and the pixel units 600 which are defined by the gate lines 400 and the data lines 500. The first alignment layer 140 comprises a plurality of first alignment grooves 141 which are arranged in a first direction. The orientation 140A of the first alignment grooves 141 forms the first intersection angle $\alpha$ with respect to the positive direction 600A of the first side of each of the pixel units 600. The first intersection angle $\alpha$ is an obtuse angle. The first intersection angle $\alpha$ is smaller than an intersection angle between the orientation 300W of the liquid crystal molecule 300 in the working state and the positive direction 600A of the first side of each of the pixel units 600. In this embodiment, since the first intersection angle $\alpha$ is an obtuse angle, the rotation angle of liquid crystal decreases, which improves the responsive time.

In an embodiment, each of the pixel units 600 comprises the pixel electrode 130 and the common electrode 120. As shown, the pixel electrode 130 is strip shaped electrodes, and the strip shaped electrodes are provided with slits 135 for generating the horizontal driving electric field. A direction in which the strip shaped electrodes 130 are arranged forms a second intersection angle $\beta$ with respect to the positive direction 600A of the first side of each of the pixel units 600. The second intersection angle $\beta$ is an acute angle.

In an embodiment, the first intersection angle $\alpha$ and the second intersection angle $\beta$ satisfy the relation of: $\alpha<\beta+90°$.

In an embodiment, the first intersection angle $\alpha$ satisfies the relation of: $90°<\alpha\leq120°$. For example, the first intersection angle $\alpha=100°$.

In an embodiment, the second intersection angle $\beta$ satisfies the relation of: $80°\leq$ the second intersection angle $\beta<90°$. For example, the second intersection angle $\beta=85°$.

In an embodiment, the first side is the short side of each of the pixel units.

As shown in FIG. 1, the display panel comprises the counter substrate 200. The counter substrate 200 comprises a second alignment layer 240. The second alignment layer comprises a plurality of second alignment grooves which are arranged in a second direction (not shown), and the second direction is parallel with the first direction.

In embodiments of the present disclosure, as shown, the orientation of the first alignment grooves 141 and the positive direction of the short side of each of the pixel units in the display panel form an intersection angle $\alpha$ which is an obtuse angle larger than 90° and smaller than or equal to 120°. For example, the obtuse angle is 100°. In particular, for example, if the pixel electrode in the display panel is inclined by 85° with respect to the positive direction of the short side of each of the pixel units, and the liquid crystal layer for example comprises a positive liquid crystal (which has a long axis along the direction of electric field lines), an initial angle of the liquid crystal is an intersection angle of 100° with respect to the positive direction of the short side of each of the pixel units. In case the liquid crystal is deflected by the electric field to a direction parallel with the electric field (inclined by 175° with respect to the positive direction of the short side of each of the pixel units), the rotation angle Δθ of the liquid crystal=175°−100°=75°. In embodiments of the present disclosure, a rubbing direction is changed, so that the direction of alignment grooves and the positive direction of the short side of each of the pixel units in the display panel form an intersection angle of 100°. As a result, the initial direction of liquid crystal forms an intersection angle of 100° with respect to the positive direction of the short side of each of the pixel units in the display panel, this decreases the rotation angle of liquid crystal molecule, and this can improve the recovery rate to improve Toff. Of course, decreasing the deflection angle also improves Ton to some extent. The rubbing direction as used herein indicates the orientation of alignment grooves.

Figures 4A, 4B, 5:
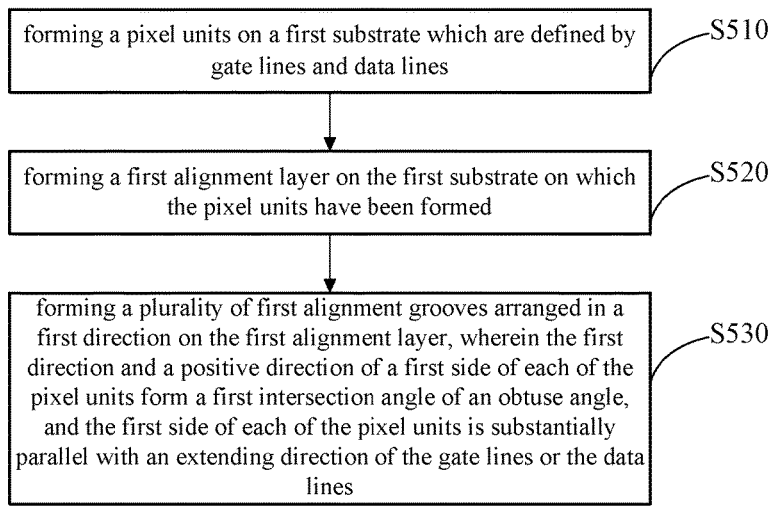
FIG. 4A and FIG. 4B show liquid crystal responsive time of a display panel in an embodiment of the present disclosure.
FIG. 5 is a flow chart for illustrating a method for fabricating a display substrate in an embodiment of the present disclosure.

FIG. 4A and FIG. 4B show liquid crystal responsive time in a display panel in an embodiment of the present disclosure. FIG. 4A shows the liquid crystal responsive time when the rotation angle of liquid crystal molecule is 85°, and FIG. 4B shows the liquid crystal responsive time when the rotation angle of liquid crystal molecule is 75°. In FIGS. 4A and 4B, values 0, 32, 64, 96, 128, 160, 192, 224, 255 in the first row and the first column indicate gray scale levels, and the table cells where the rows and columns intersect indicate the liquid crystal responsive time (in ms). For example, in FIG. 4A, the value 31.35 in the cell where the second row and the third column intersect indicates a responsive time of 31.35 ms from a gray scale 0 to a gray scale 32. Namely, FIGS. 4A and 4B show rising edge responsive times and falling edge responsive times for different rotation angles. As shown in FIGS. 4A and 4B, in simulation tests, the rotation angle of liquid crystal molecule is 85° when the rubbing direction is 90°, and 75° when the rubbing direction is 100°. As can be seen clearly, the responsive time of liquid crystal can be reduced significantly by adjusting the rubbing direction. When the rotation angle is 85°, the liquid crystal responsive time has a maximum value of 43.06 ms (from gray scale 0 to gray scale 96), while when the rotation angle is 75°, the maximum value of the liquid crystal responsive time dramatically falls to 32.83 ms (from gray scale 0 to gray scale 32). Moreover, when the rotation angle is 85°, the liquid crystal responsive time is 14.56 ms from gray scale 0 to gray scale 255 and 13.55 ms from gray scale 255 to gray scale 0. While when the rotation angle is 75°, these two values fall to 13.69 ms and 12.54 ms, respectively.

For example, in case the rubbing direction is 90°, the rotation angle of liquid crystal molecule is 85°, and the responsive time of liquid crystal is shown in Table 1.

TABLE 1

| liquid crystal responsive time (in ms) in case the rotation angle of liquid crystal molecule is 85° | |
|---|---|
| B/W RT | 28.11 |
| GTG RT average | 43.06 |
| GTG RT average | 23.7 |

As shown in Table 1, when the rotation angle of liquid crystal molecule is 85°, the liquid crystal has a B/W RT of 28.11 ms, and a GTG RT with a maximum value of 43.06 ms and an average value of 23.7 ms. In the context of the present disclosure, the term B/W RT indicates a responsive time of a pixel unit from black to white or from white to black, and the term GTG RT indicates a responsive time of a pixel unit from 10% gray to 90% gray or from 90% gray to 10% gray.

For example, in case the rubbing direction is 100°, the rotation angle of liquid crystal molecule is 75°, and the responsive time of liquid crystal is shown in Table 2.

TABLE 2

| liquid crystal responsive time (in ms) in case the rotation angle of liquid crystal molecule is 75° | |
|---|---|
| B/W RT | 26.23 |
| GTG RT average | 32.83 |
| GTG RT average | 19.3 |

As shown in Table 2, when the rotation angle of liquid crystal molecule is 75°, the liquid crystal has a B/W RT of 26.23 ms, and a GTG RT with a maximum value of 32.83 ms and an average value of 19.3 ms.

Driving voltages and GTG RTs for different alignment groove angles are simulated by taking liquid crystal with a model of ZBE-5231 and a cell thickness of 2.0 micrometers. The simulation results are shown in Table 3. As shown, by changing the rubbing direction, the rotation angle of liquid crystal molecule is decreased, and the GTG RT shows a trend of gradual decrease, while the driving voltage shows a trend of increase. Due to the limited support range of a driving IC (generally a maximum driving voltage of 5.5 V), the rubbing direction of 100° is selected as the orientation of the first alignment grooves.

TABLE 3

| relationship between different alignment groove angles and the rotation angle of liquid crystal molecule, the driving voltage, and the responsive time | | | | | | | |
|---|---|---|---|---|---|---|---|
| rubbing direction | 90° | 95° | 100° | 105° | 110° | 115° | 120° |
| rotation angle | 85° | 80° | 75° | 70° | 65° | 60° | 55° |
| Vop | 4.9 | 5.2 | 5.5 | 5.8 | 6.2 | 6.6 | 7.6 |
| Ton | 4.5 | 3.8 | 3.4 | 3.3 | 3.1 | 3 | 2.7 |
| Toff | 2.87 | 2.81 | 2.78 | 2.74 | 2.69 | 2.66 | 2.65 |
| GTG RT | 7.4 | 6.6 | 6.2 | 6.0 | 5.8 | 5.7 | 5.4 |

In an embodiment of the present disclosure, the display panel further comprises: a second substrate which is arranged oppositely to the first substrate and comprises a second alignment layer with a plurality of second alignment grooves; and a liquid crystal layer, which is arranged between the first substrate and the second substrate. In embodiments of the present disclosure, the second alignment grooves have a similar configuration with the first alignment grooves, and are not repeated herein for simplicity. For example, in case no voltage is applied, in order to block the light through the display panel with the liquid crystal layer, and thus to avoid light leakage, the second alignment grooves have the same orientation as the first alignment grooves.

In embodiments of the present disclosure, the first substrate of the display panel comprises pixel electrode and a plate shaped common electrode. The pixel electrode comprises a plurality of strip shaped electrodes for generating a driving electric field. The arranging direction of the strip shaped electrodes and the positive direction of the long side of each of the pixel units in the display panel form a second intersection angle β of an acute angle. The common electrode is a planar electrode. The second intersection angle β between the orientation of the strip shaped electrodes and the positive direction of the short side of each of the pixel units in the display panel is larger than or equal to 80° and smaller than 90°. For example, the acute angle is 85°.

As shown in FIG. 5, embodiments of the present disclosure further provides a method for fabricating a display panel, comprising steps of: S510 forming a pixel units on a first substrate which are defined by gate lines and data lines; S520 forming a first alignment layer on the first substrate on which the pixel units have been formed; and S530 forming a plurality of first alignment grooves which are arranged in a first direction on the first alignment layer, wherein the first direction and a positive direction of a first side of each of the pixel units form a first intersection angle of an obtuse angle, the first intersection angle is smaller than an intersection angle between an orientation of liquid crystal molecule in a working state and the positive direction of the first side of each of the pixel units, and the first side of each of the pixel units is substantially parallel with an extending direction of the gate lines or the data lines. The first intersection angle α is an obtuse angle which for example is larger than 90° and smaller than or equal to 120°. For example, the obtuse angle is 100°. For example, if the pixel electrode in the display panel is inclined by 85° with respect to the positive direction of the short side of each of the pixel units, and the liquid crystal layer comprises a positive liquid crystal, the liquid crystal has an initial angle which is an intersection angle of 100° with the positive direction of the short side of each of the pixel units. In case the liquid crystal is deflected by an electric field to a direction parallel with the electric field (which is inclined by 5° with respect to the positive direction of the short side of each of the pixel units), the rotation angle of liquid crystal is 75°. In embodiments of the present disclosure, a rubbing direction is changed, so that the direction of alignment grooves and the positive direction of the short side of each of the pixel units in the display panel form an intersection angle of 100°. As a result, the initial direction of liquid crystal forms an intersection angle of 100° with respect to the positive direction of the short side of each of the pixel units in the display panel, this decreases the rotation angle of liquid crystal molecule, and this can improve the recovery rate to improve Toff. Of course, decreasing the deflection angle also improves Ton to some extent. The rubbing direction as used herein indicates the orientation of alignment grooves.

In an embodiment of the present disclosure, the method for fabricating a display panel further comprises: forming a second substrate; forming a second alignment layer on the second substrate; forming a plurality of second alignment grooves on the second alignment layer. In embodiments of the present disclosure, the second alignment grooves have a similar configuration with the first alignment grooves, and are not repeated herein for simplicity. For example, in case no voltage is applied, in order to block the light through the display panel with the liquid crystal layer, and thus to avoid light leakage, the second alignment grooves have the same orientation as the first alignment grooves.

In an embodiment of the present disclosure, the method for fabricating a display panel further comprises: forming a pixel electrode and a plate shaped common electrode on the first substrate. The pixel electrode comprises a plurality of strip shaped electrodes for generating a driving electric field. The arranging direction of the strip shaped electrodes and the positive direction of the long side of each of the pixel units in the display panel form a second intersection angle of an acute angle. The common electrode is a planar electrode. The second intersection angle is larger than or equal to 80° and smaller than 90°. For example, the second intersection angle is 85°.

In the embodiments as described above, the pixel unit has a rectangular shape which comprises a long side and a short side, and the short side is parallel with the side of the display panel. However, the present disclosure is not limited to this. In exemplary embodiments, the pixel unit has a square shape. In other embodiments, the pixel unit has a parallelogram shape.

It is noted that, the solutions of the present disclosure can be applied to any liquid crystal display panel in which the liquid crystal is subject to an in-plane deflection upon application of an electric field.

Embodiments of the present disclosure further provide a display device, which comprises the display panel as described in any foregoing embodiments. The display device can be any product or component with a display function, such as a liquid crystal panel, a mobile phone, a tablet computer, a TV set, a monitor, a notebook computer, a digital photo frame, or a navigator. By adopting the above display panel, the display device in embodiments of the present disclosure reduces the rotation time of the liquid crystal molecule, and can significantly reduce the responsive time of liquid crystal.

To sum up, embodiments of the present disclosure provide a display substrate, a method for fabricating the same, a display panel, and a display device. The display substrate comprises pixel units which are defined by gate lines and data lines, and a first alignment layer, wherein the first alignment layer comprises a plurality of first alignment grooves which are arranged in a first direction, the first direction and a positive direction of a first side of each of the pixel units form a first intersection angle, the first intersection angle is an obtuse angle, and the first intersection angle is smaller than an intersection angle between an orientation of liquid crystal molecule in a working state and the positive direction of the first side of each of the pixel units, and the first side of each of the pixel units is substantially parallel with an extending direction of the gate lines or the data lines. By changing the direction of alignment grooves in the alignment film, the rotation angle of liquid crystal molecule is decreased, and the responsive time of liquid crystal is thus reduced.

In the present disclosure, the embodiments as well as features in the embodiments can be combined with each other without conflict. The present disclosure is neither limited to any single aspect, nor to any single embodiment.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A display substrate, comprising pixel units which are defined by gate lines and data lines, and a first alignment layer,
wherein the first alignment layer comprises a plurality of first alignment grooves which are arranged in a first direction, the first direction and a positive direction of a first side of each of the pixel units form a first intersection angle, the first intersection angle is an obtuse angle, the first intersection angle is smaller than an intersection angle between an orientation of liquid crystal molecule in a working state and the positive direction of the first side of each of the pixel units, and the first side of each of the pixel units is substantially parallel with an extending direction of the gate lines or the data lines.

2. The display substrate of claim 1, wherein each of the pixel units comprises a pixel electrode and a common electrode, and at least one of the pixel electrode and the common electrode comprises a plurality of strip shaped electrodes for generating a horizontal driving electric field, an arranging direction of the strip shaped electrodes and a positive direction of a first side of each of the pixel units forms a second intersection angle, and the second intersection angle is an acute angle.

3. The display substrate of claim 2, wherein the common electrode is a plate shaped electrode, and the pixel electrode comprises the plurality of strip shaped electrodes.

4. The display substrate of claim 2, wherein the first intersection angle and the second intersection angle satisfy the relation of: the first intersection angle<the second intersection angle+90°.

5. The display substrate of claim 1, wherein the first intersection angle satisfies the relation of: 90°<the first intersection angle≤120°.

6. The display substrate of claim 5, wherein the first intersection angle is 100°.

7. The display substrate of claim 4, wherein the second intersection angle satisfies the relation of: 80°≤the second intersection angle<90°.

8. The display substrate of claim 4, wherein the second intersection angle is 85°.

9. The display substrate of claim 1, wherein the first side is a short side of the pixel unit.

10. A display panel, comprising:
the display substrate of claim 1;
a counter substrate, which is arranged oppositely to the display substrate; and
a liquid crystal layer, which is arranged between the display substrate and the counter substrate.

11. The display panel of claim 10, wherein the counter substrate comprises a second alignment layer, the second alignment layer comprises a plurality of second alignment grooves which are arranged in a second direction, and the second direction is parallel with the first direction.

12. The display panel of claim 10, wherein the liquid crystal layer comprises a positive liquid crystal.

13. A display device, comprising the display panel of claim 10.

14. A method for fabricating a display substrate, comprising:
forming a pixel units on a first substrate which are defined by gate lines and data lines;
forming a first alignment layer on the first substrate on which the pixel units have been formed; and
forming a plurality of first alignment grooves which are arranged in a first direction on the first alignment layer, wherein the first direction and a positive direction of a first side of each of the pixel units form a first intersection angle, the first intersection angle is an obtuse angle, the first intersection angle is smaller than an intersection angle between an orientation of liquid crystal molecule in a working state and the positive direction of the first side of each of the pixel units, and the first side of each of the pixel units is substantially parallel with an extending direction of the gate lines or the data lines.

15. The method of claim 14, wherein forming the pixel units comprises: forming a plate shaped common electrode on the first substrate, and forming on the common electrode a pixel electrode which comprises a plurality of strip shaped electrodes for generating a horizontal driving electric field,
wherein an arranging direction of the strip shaped electrodes and a positive direction of a first side of each of the pixel units forms a second intersection angle, and the second intersection angle is an acute angle.

16. The method of claim 15, wherein the first intersection angle and the second intersection angle satisfy the relation of: the first intersection angle<the second intersection angle+90°.

17. The method of claim 14, wherein the first intersection angle satisfies the relation of: 90°<the first intersection angle≤120°.

18. The method of claim 17, wherein the first intersection angle is 100°.

19. The method of claim 16, wherein the second intersection angle satisfies the relation of: 80°≤the second intersection angle<90°.

20. The method of claim 19, wherein the second intersection angle is 85°.

* * * * *